UNITED STATES PATENT OFFICE.

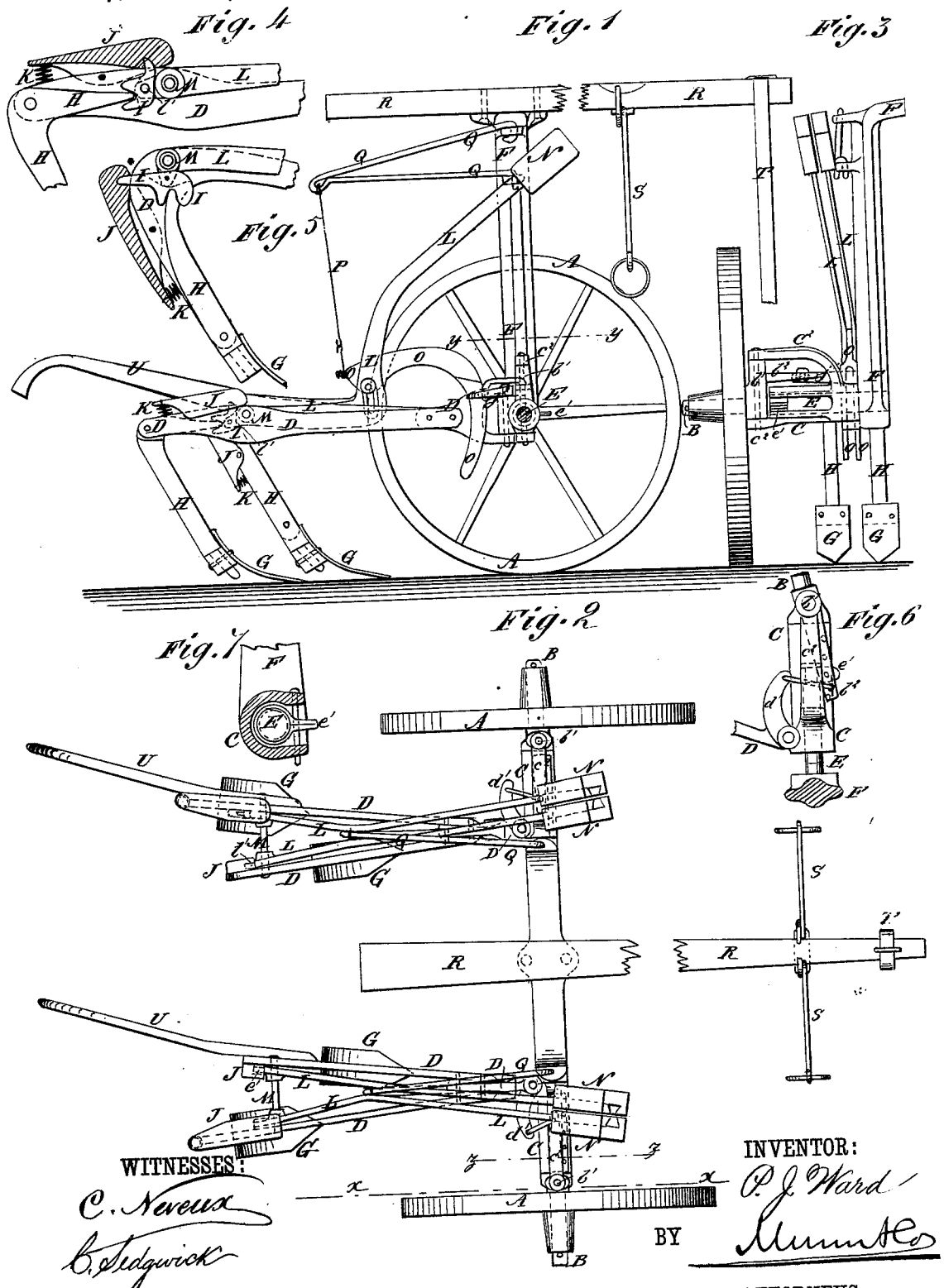

PATRICK J. WARD, OF ST. MARY'S, INDIANA.

IMPROVEMENT IN CULTIVATORS.

Specification forming part of Letters Patent No. 200,955, dated March 5, 1878; application filed December 27, 1877.

*To all whom it may concern:*

Be it known that I, PATRICK J. WARD, of St. Mary's, in the county of Vigo and State of Indiana, have invented a new and useful Improvement in Cultivators, of which the following is a specification:

Figure 1 is a side view of my improved cultivator, partly in section, through the line $xx$, Fig. 2. Fig. 2 is a top view of the same. Fig. 3 is a front view of one side of the same. Fig. 4 is a detail view of the lock for the plow-standard. Fig. 5 shows a modification of the same. Fig. 6 is a top view of the device for connecting the wheel to the arched bar, being shown in section through the line $yy$, Fig. 1. Fig. 7 is a cross-section of the same, taken through the line $zz$, Fig. 2.

Similar letters of reference indicate corresponding parts.

The object of this invention is to furnish an improved cultivator which shall be easier guided, and will enable the plowman to plow closer to trees, stumps, fences, and the ends of the rows than cultivators constructed in the usual way, which will allow the plow-standards to swing back, when the plows strike an obstruction, without breaking the machine, which may be used for plowing tall corn without any danger of breaking it down or injuring it, and which will hold the plows raised for convenience in passing from place to place.

The invention will first be described in connection with the drawing, and then pointed out in the claims.

A are the wheels, which revolve upon the journals B. Upon the inner end of each journal B is formed an upright arm, $b^1$, the lower end of which is pivoted to a lug, $c^1$, formed upon the lower part of the outer end of the sleeve C. The upper end of the arm $b^1$ is pivoted to the outer end of a curved arm, $c^2$, formed upon the upper side of the sleeve C, near its inner end. Upon the inner side of the middle part of the upright arm $b^1$ is formed a horizontal arm, $b^2$, which projects into the space between the sleeve C and its curved arm $c^2$. To the inner end of the arm $b^2$ is pivoted, or connected by a link-connection, the end of a curved arm, $d'$, formed upon or attached to the branched forward end of the plow-beam D, the ends of the branches of which are hinged to the inner end of the sleeve C. The sleeve C slides out and in upon the spindles E, formed upon or rigidly attached to the outer sides of the lower ends of the arched bar or axle F, which arch is made high, so as to readily pass over tall corn. To the outer ends of the spindles E are attached lugs $e'$, which project through longitudinal slots in the forward sides of the sleeves C. In the sleeves C, along the sides of their slots, are formed holes to receive pins, which are passed through or at the sides of the lugs $e'$, to prevent the said sleeves C from sliding upon the spindles E, and enable the sleeves to be secured in any desired position upon the spindles, adjusting the beams D and wheels A wider apart or closer together, as circumstances may require.

The function of the lug $e'$ on the outer end of the spindle E is to prevent the sleeve from sliding off, and to hold it far from or near to the arch, so as to cause the plows to run near to or far from the row of plants, a pin being placed on each side of the lug and passed through holes on the slotted side of sleeve.

The plow-beams D are branched or made in two parts, which incline from each other, and are made of different lengths, to bring the plows G to the proper distance apart. The plows G are attached to the lower ends of the standards H. The standards H are pivoted to the beams D. The beams D or the standards H are bent at an angle to bring the plows into proper working position.

The upper ends of the standards H enter notches in the lock-blocks I, which have short arms formed upon their rear or upper parts, to engage with the forward or upper end of the latches J. The latches J are pivoted to the rear parts of the beams D, and their rear ends are held out by spiral or other springs, K, interposed between them and the said beams D. The lock-blocks I have sockets formed in them to receive the short arms $l'$, formed upon the rear ends of the levers L, which are pivoted to a rod, M, attached to and connecting the beams D of each pair. The levers L project forward nearly in line with the beams D, are bent upward nearly at right angles near the forward ends of the said beams D, and their upper parts are bent forward and have weights N attached to their upper ends.

The levers L at their angles have short vertical slots formed in them, to receive the pivot that pivots them to the lever O near its rear end. The forward part of the lever O is curved downward, and is forked or slotted to straddle the forward part of the beam D. To the rear end of the lever O is attached the lower end of a wire, rod, or chain, P, the upper end of which is attached to the rear end of the arm Q. The forward end of the arm Q is hinged to the upper part of the arms of the bent bar or axle F in such a way that it may have a free lateral, but no vertical, movement. To the center or sides of the arch or bend of the bar or axle F is rigidly attached the tongue R, which projects forward horizontally, or nearly so, and to it, near its forward end, are pivoted the upper ends of the arms S, the lower ends of which are provided with rings or loops, to receive the breast-straps of the harness.

The arms S give the horses control over the machine, while dispensing with a neck-yoke, and allowing the tongue to be at such a height as to be out of the way of tall corn.

The forward end of the tongue R may be held down by a strap, T, passed through a keeper attached to it, and the ends of which are buckled to the collars of the harness.

U are the handles, which are rigidly attached to the beams D, and incline to one side, so that they can be grasped and operated by the plowman while walking at one side of the row of plants being cultivated, to guide the plows.

By this construction, by moving the handles U outward or inward the wheels will be turned outward or inward, and will slide the sleeves C out or in upon the spindles E, making it very easy to guide the plows. By raising the handles U, the weights N will descend in front of the axle, and will thus balance the plows away from the ground.

The lever O is intended to sustain the weighted levers, and keep them in position for falling forward whenever the handles are raised.

With this construction, also, when a plow, G, strikes an obstruction with sufficient force to raise the weight N, the lever L will rise upon the pin that pivots it to the lever O, and this movement will withdraw the lock-block I from the spring-latch J K, and allow the standard H to swing back, thus preventing breakage.

The plowman can lock the standard H again in place by pressing the lower end of the said standard forward with his foot.

Having thus described my invention, I claim as new and desire to secure by Letters Patent—

1. The combination of the journal B, provided with the upright arm $b^1$ and the horizontal arm $b^2$, the sleeve C, provided with the lug $c^1$, the curved arm $c^2$, and the curved arm $d'$, with the wheel A, the spindle E of the arched bar or axle F, and the plow-beam D, substantially as herein shown and described.

2. The combination of the bent levers L, the weights N, the bent and slotted levers O, the rods, wires, or chains P, and the hinged arms Q with the plow-beams D and the arched bar or axle F, substantially as herein shown and described.

3. The combination of the lock-block I and spring-latch J K with the arm formed upon the pivoted end of the weighted lever L N, the plow-beam D, and the plow-standard H, as and for the purpose specified.

PATRICK J. WARD.

Witnesses:
  JAMES P. TOWNLEY,
  A. N. SMITH.